United States Patent [19]

Salama et al.

[11] Patent Number: 4,755,076

[45] Date of Patent: Jul. 5, 1988

[54] SPIKE AND SOCKET CABLE TERMINATION

[75] Inventors: Mamdouh M. Salama; Jerry G. Williams, both of Ponca City, Okla.

[73] Assignee: Conoco Inc., Ponca City, Okla.

[21] Appl. No.: 934,985

[22] Filed: Nov. 25, 1986

[51] Int. Cl.⁴ .............................................. F16G 11/05
[52] U.S. Cl. .................................... 403/275; 29/461; 24/122.3; 403/277
[58] Field of Search ................ 24/122.6, 122.3, 114.5; 403/275, 277, 280, 365, 248; 29/461

[56] References Cited

U.S. PATENT DOCUMENTS

| | | | |
|---|---|---|---|
| 728,689 | 5/1903 | Am Ende . | |
| 3,100,924 | 8/1963 | Trier et al. | 403/275 |
| 3,129,282 | 4/1964 | Flynn | 403/275 |
| 3,226,805 | 1/1966 | Scott et al. | 403/275 X |
| 3,229,341 | 1/1966 | Maras | 403/275 |
| 3,475,795 | 11/1969 | Youngblood | 24/122.6 |
| 3,570,074 | 3/1971 | Schimmeyer et al. | 24/123 |
| 3,698,749 | 10/1972 | Yonkers | 403/368 X |
| 3,739,457 | 6/1973 | Davis | 403/275 X |
| 3,909,886 | 10/1975 | Hocke | 24/122.6 |
| 4,123,133 | 10/1978 | Pickett et al. | 339/273 R |
| 4,507,008 | 3/1985 | Adl et al. | 403/275 |

FOREIGN PATENT DOCUMENTS 2091770 8/1982 United Kingdom ................ 24/122.6

OTHER PUBLICATIONS

Brochure of Linear Composites Limited entitled "PARAFIL rope" (Basic Physical Properties of Parafil Ropes).

Brochure of Linear Composites Limited entitled "PARAFIL rope" (140 mm Type F Parafil).

*Primary Examiner*—Andrew V. Kundrat
*Attorney, Agent, or Firm*—Richard K. Thomson

[57] ABSTRACT

A spike and socket cable termination assembly includes an outer socket having a substantially conical bore disposed therethrough with the bore having a smaller first open end and a larger second open end. The socket is constructed of a first material. A cable has an end portion thereof received through the smaller first open end of the substantially conical bore. A spike having a substantially conical outer surface is received through the larger second open end of the conical bore and in a center portion of the cable end portion with strands of the cable distributed in a substantially conical shape between the spike and socket. The spike is tightly wedged in the socket so that strands of the cable are held in place between the spike and socket. The spike is constructed of a second material having a modulus of elasticity substantially greater than the modulus of elasticity of the first material from which the socket is constructed. This substantially reduces transverse normal compressive stresses applied to the strands of the cable end portion thus increasing a cyclical load life of the cable as compared to a similar spike and socket having the socket modulus of elasticity at least as great as the spike modulus of elasticity.

9 Claims, 5 Drawing Sheets

SPIKE AND SOCKET CABLE TERMINATION

BACKGROUND OF THE INVENTION

1. Field of the Invention

The present invention relates to spike and socket cable terminations, and particularly, to a spike and socket cable termination adapted for use with high strength parallel-lay fiber cables.

2. Description of the Prior Art

Many physical structures utilize cables to carry tension loads. Typically, mechanical connectors will be attached to the end of the cable in order to provide a reliable and convenient means for transferring loads to and from the cable.

One general type of end connector which has been widely used is a spike and socket connection. A spike and socket connection comprises a socket having a substantially conical bore in which an end of the cable is received. The spike is then driven into the end of the cable to spread the fibers thereof in a conical shape and wedge them between the conical bore of the socket and an outer surface of the spike.

The spike and socket of these prior art devices are comprised of the same material, usually steel in high strength connectors.

One example of a typical prior art connector would have a physical appearance like that shown in FIG. 1, but would have both the socket and spike constructed of the same material, i.e., steel, titanium or aluminum.

Another spike and socket connector for wire ropes is shown in U.S. Pat. No. 728,689 to Am Ende.

One variation of spike and socket connectors is shown in U.S. Pat. No. 4,507,008 to Adl et al. in which a cable end 13 and a malleable hollow conical sleeve 22 are sandwiched between a high strength socket 10 and high strength spike 20. The hollow conical malleable sleeve deforms to grip the cable fibers as shown in FIG. 3 of Adl et al., thus allegedly reducing slippage between the cable and the socket to zero.

Another variation somewhat similar to that of Adl et al. is shown in U.S. Pat. No. 3,475,795 to Youngblood. The connector of Youngblood has four components, namely, a socket 12 having a conical bore 11, a hollow two-piece conical liner 15 received in the conical bore 11, a hollow conical malleable plug 20 which is received between the outer strands 14 of cable 10 and a center strand 13, and finally a solid central spike 23 which is driven into the central strand 13 to wedge it within the hollow malleable plug 20. The hollow malleable plug 20 deforms as shown in FIG. 6 of Youngblood to aid in gripping the outer strands of the cable.

Yet another approach is shown in U.S. Pat. No. 3,909,886 to Hocke wherein the spike has a necked down portion about which the fibers of the cable are banded.

Finally, U.S. Pat. No. 3,570,074 to Schimmeyer et al. discloses a rope end connection of the potted type in which a synthetic resin potting material is utilized to aid in forming the end connection between the spike and socket.

SUMMARY OF THE INVENTION

The present invention is particularly directed to an improvement in spike and socket terminal connections for high strength parallel-lay fiber cables.

It has been determined that significant improvements in cyclic load life of such an end connection are provided by constructing the socket of a material having a modulus of elasticity substantially less than the modulus of elasticity of the spike. This provides a significant decrease in the transverse normal stresses applied to strands of the cable end held between the socket and spike, thus significantly reducing abrasion and wear of the cable strands adjacent the spike and socket during cyclic loading.

Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figures 1, 2:
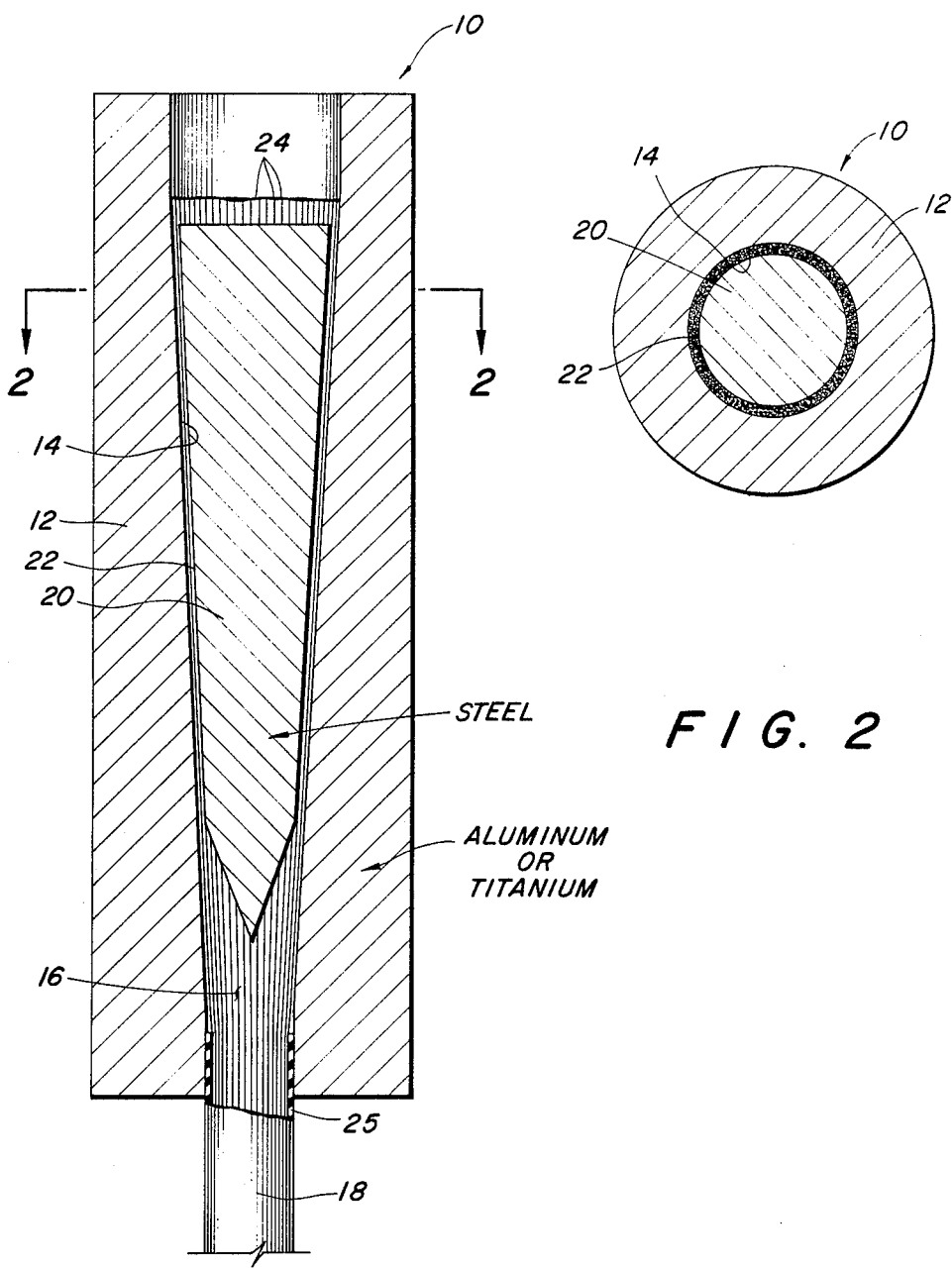
FIG. 1 is an elevation section view of the spike and socket cable termination assembly of the present invention as connected to a parallel-lay Kevlar fiber cable.
FIG. 2 is a cross-section view of the cable termination assembly of FIG. 1 taken along line 2—2 of FIG. 1.

Referring now to the drawings, and particularly to FIG. 1, a spike and socket cable termination assembly is shown and generally designated by the numeral 10.

The assembly 10 includes an outer socket 12 having a substantially conical bore 14 disposed therein for receiving an end portion 16 of a cable 18.

A spike 20 having a substantially conical outer surface 22 is received in an axially central location within the cable end portion 16 with strands 24 of the cable 18 distributed in a substantially conical shape between the spike 20 and the socket 12, for wedging the cable end portion 16 in place within the socket 12.

The cable 18 has a plastic sheath 25 surrounding the strands 24.

Although the term "cable" is used throughout this specification, it will be understood that this designation includes any cable-like member made up of multiple strands, such as ropes, wire cables, and the like. Also the term "strands" as used herein refers to any elements making up the cable whether they be twisted or braided strands which themselves are constructed from smaller elements or whether they be individual filament-type strands.

The socket 12 is constructed of a material of substantially lower modulus of elasticity than the spike 20. This substantially reduces a transverse normal stress applied to the strands 24 of the cable end portion 16 thereby increasing a cyclical load life of the cable 18 adjacent the spike and socket termination as compared to a similar spike and socket termination having its socket modulus of elasticity at least as great as its spike modulus of elasticity.

Preferably, the spike is constructed of steel having a modulus of elasticity of approximately 30,000,000 psi and the socket is constructed of aluminum or titanium having a modulus of elasticity of approximately 10,000,000 psi or 15,000,000 psi, respectively.

Although the socket is constructed of a material having a modulus of elasticity substantially less than that of the spike, the socket material is preferably sufficiently non-malleable that the conical bore 14 of the socket 12 is not substantially deformed by engagement with individual strands 24 of the cable 18.

Figure 3:
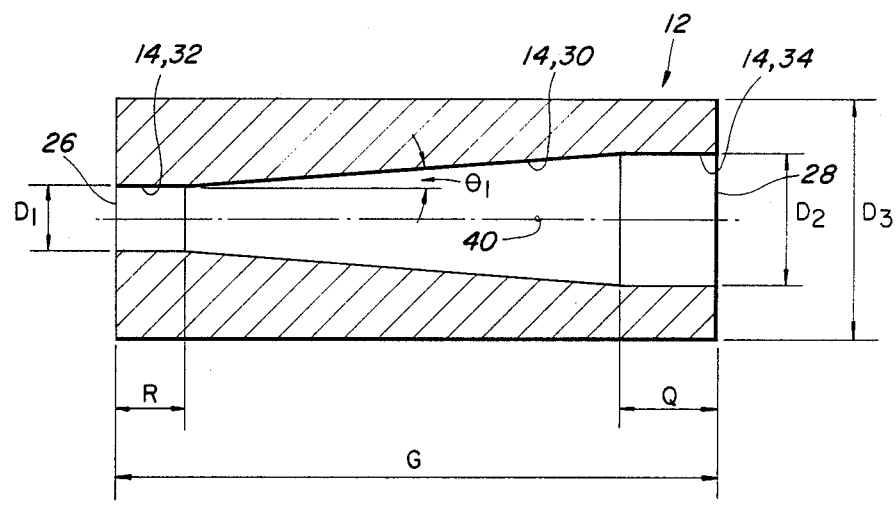
FIG. 3 is a longitudinal section view of the socket of FIG. 1 labeled to identify the various dimensions thereof as found in Table I below.
Figure 4:
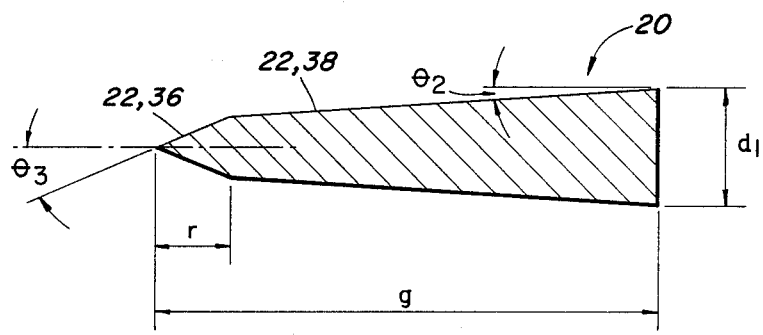
FIG. 4 is a longitudinal section view of the spike of FIG. 1 labeled to identify the various dimensions thereof as further described in Table I below.

A typical construction for such a socket and spike is more apparent from the individual longitudinal section views of the socket and spike shown in FIGS. 3 and 4, respectively.

As is apparent in FIG. 3, the substantially conical bore 14 of socket 12 has a smaller open first end 26 and a larger open second end 28.

Additionally, it is apparent in FIG. 3 that the substantially conical bore 14 does not have to be frusto-conical throughout its entire length. In the embodiment of FIG. 3, a central frusto-conical portion 30 of bore 14 has a smaller diameter short cylindrical bore portion 32 at its first end and a larger diameter short cylindrical bore portion 34 at its second end.

As is apparent in FIG. 4, the substantially conical outer surface 22 of spike 20 is not completely conical in shape. It has a more sharply tapered conical tip portion 36 joined with a longer shallow tapered frusto-conical portion 38.

The various dimensions of lengths and angles of the socket 12 and spike 20 as represented by various alphabetical symbols in FIGS. 3 and 4 for two specific cables are set forth in Table I below. The "Specimen Type" designated in the two right-hand columns as "6 Tonne" and "30 Tonne" refer to high strength parallel-lay Kevlar fiber ropes having nominal six metric ton and thirty metric ton ratings available from Linear Composites Limited of North Yorkshire, England as designated by the trademark PARAFIL TM. The outside diameters of the 6-ton and 30-ton Kevlar ropes are approximately ⅜ inch and ¾ inch, respectively.

TABLE I

|  | Dimension | Specimen Type | |
|---|---|---|---|
|  |  | 6 Tonne | 30 Tonne |
| Socket | G | 4.25 in | 9.25 in |
|  | $D_3$ | 1.390 in | 2.985 in |
|  | $D_1$ | 0.450 in | 0.890 in |
|  | $D_2$ | 0.775 in | 1.700 in |
|  | R | 0.650 in | 0.750 in |
|  | Q | 0.500 in | 0.750 in |
|  | $\theta_1$ | 3.0° | 3.0° |
| Spike | g | 3.00 in | 6.75 in |
|  | $d_1$ | 0.707 in | 1.480 in |
|  | r | 0.5 in | 1.0 in |
|  | $\theta_2$ | 3.5° | 3.5° |

TABLE I-continued

| Dimension | Specimen Type | |
|---|---|---|
|  | 6 Tonne | 30 Tonne |
| $\theta_3$ | 20.0° | 20.0° |

One particular application of a steel spike with an aluminum socket terminal connection in combination with a high strength parallel-lay Kevlar fiber cable which is contemplated by the present invention is the use of such a cable with such a terminal connection as a tethering cable in a tension leg platform. The tension leg platform is a relatively new development in offshore oil and gas production platforms which comprises a buoyant platform held in a semisubmerged position by a plurality of tensioned tethering elements such as is shown, for example, in U.S. Pat. No. 4,226,555 to Bourne, Jr., et al. and assigned to the assignee of the present invention. Such an application involves extremely high cyclical tension loads under very severe environmental conditions.

The parallel-lay Kevlar fiber cables have the fibers lying substantially parallel to the length of the cable although there may be a very slight twist thereto. For an application such as the tethering element of a tension leg platform it is desired that the cable have relatively low stretch and thus cables having a twisted fiber arrangement are not preferred.

The parallel-lay Kevlar fiber cables contemplated for use as tethering elements for a tension leg platform are necessarily of rather larger dimensions than the 6-ton and 30-ton cables described above with regard to Table I. Such cables would more likely be designed for nominal loads on the order of 1,000,000 pounds, which would have an outside diameter of the cable of approximately four inches, or 3,275,000 pounds, which would have an outside diameter of approximately 5.5 inches.

Tests have been performed with a standard steel spike and steel socket termination on some of these larger cables, namely, a 331,000-pound cable and the 1,000,000 pound cable. The results of five such tests are set forth below in Table II.

TABLE II

STRENGTH OF PARAFIL TM "F" KEVLAR ROPE WITH STEEL SPIKE AND STEEL SOCKET TERMINATIONS FOLLOWING CYCLIC LOADING

| Test | Ultimate load, lb. | Minimum Cyclic Load, lb. (% Ult.) | Maximum Cyclic Load, lb. (% Ult.) | Cycles to Failure |
|---|---|---|---|---|
| 1 | 331,000 | 66,150 (20%) | 198,450 (60%) | 2340 |
| 2 | 992,000 | — | — | — |
| 3 | — | 149,000 (15%) | 645,000 (65%) | 700 |
| 4 | — | 149,000 (15%) | 645,000 (65%) | 1800 |
| 5 | 645,000 | — | — | — |

Test No. 1 was conducted on a 331,000-pound cable and Tests 2-5 were conducted on a 1,000,000 pound cable.

The value of 331,000 pounds ultimate load shown in the second column for Test No. 1 is not a result of the test, but instead is the manufacturer's specified ultimate load for the cable. Test 1 shows that with the 331,000-pound cable having a cyclic loading varying from a minimum load of 66,150 pounds to a maximum load of 198,450 pounds, the cable failed after 2,340 cycles.

Test No. 2 was an ultimate load pull test conducted on the one million-pound cable which resulted in failure at a load of 992,000 pounds.

In Tests Nos. 3 and 4, the one million-pound cable was cycled between a minimum load of 149,000 pounds and a maximum load of 645,000 pounds. In Test No. 3, the cable failed after 700 cycles. In Test No. 4, the cable failed after 1800 cycles.

In Test No. 5, which was intended to be a test like Tests 3 and 4, the cable failed on the first cycle due to pull-out of the cable from the spike and socket terminal.

The minimum and maximum cyclic load data in the third and fourth columns show in parentheses next to the load the percentage of ultimate load represented by the minimum or maximum loads, respectively.

Similar tests on a 13,200-pound cable at cyclic loads of 32% to 68% of ultimate load exceeded 1,000,000 cycles. The better performance for smaller diameter cable suggests a scaling effect.

The data from these tests indicate relatively poor cyclic load performance for the 331,000 pound and the one million pound cables.

The typical cyclic failure observed in Tests 1, 3, and 4 is characterized by a feathered appearance of failed fibers in which the failure surface is conical in shape and concentrated in the region of the spike tip 36. This is an abrasive failure mode caused by wearing of the fibers due to high transverse compressive loads on the fibers which are held between the socket 12 and spike 20 as those fibers are rubbed back and forth due to cyclic axial loading of the cable 18.

As will be appreciated by those skilled in the art, when a tension load is placed on the cable 18, the spike 20 is pulled some distance further down into the socket 12, and upon lessening of that tension load, the spike tends to move back out of the tapered bore 14. This is, of course, only a relatively slight movement, but when combined with the extreme transverse normal compressive loads placed on the strands of the cable 18 held between the spike 20 and the socket 12, the wear which occurs is very significant and as indicated by the tests in Table II, it results in failure of even a very high strength Kevlar fiber cable after only a relatively few load cycles.

It will be appreciated that in an environment such as a tension leg platform wherein the cyclical loading is due to wave action occurring within a period of only a few seconds, cycle lifetimes in the millions of cycles are necessary for satisfactory performance.

One manner of increasing the cyclical load life of such a spike and socket terminal assembly with such a cable is to reduce the transverse normal compressive stress on the strands of the cable held between the spike and socket. The term "transverse normal compressive stress" refers to the compressive stress applied to the strands held between the spike and socket in a direction normal to the local longitudinal axis of the cable.

In order to determine the effect of various combinations of spike and socket materials on this transverse compressive fiber stress, a spike and socket connection similar to that previously described was numerically modeled through finite element analysis and a number of stresses applied thereby to a cable like cable 18 were calculated.

Figure 8:
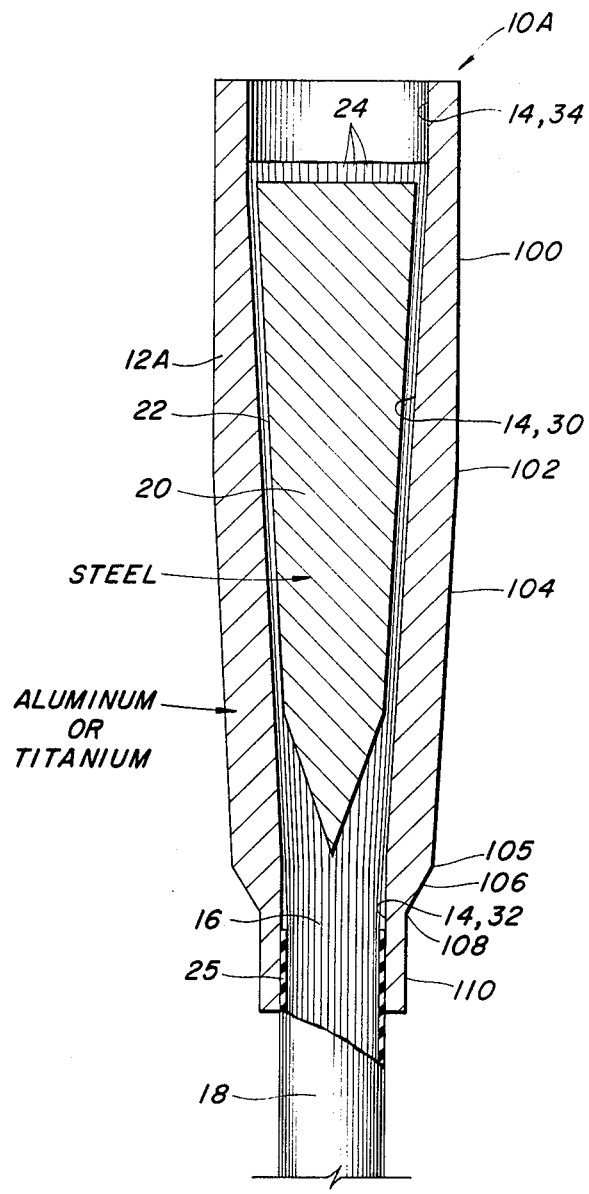
FIG. 8 is a cross-section view of a slightly modified spike and socket connection which was modeled to produce the data of FIGS. 5–7.

The particular spike and socket connection which was the subject of this numerical modeling varied slightly from the spike and socket design previously described, and is shown in FIG. 8.

The cable 18 and spike 20 shown in FIG. 8 are identical to the cable 18 and spike 20 of FIG. 1, and like numerals have been used to designate those identical parts.

The slightly modified spike and socket connection of FIG. 8 is designated by the numeral 10A. The modified socket is designated by the numeral 12A.

The socket 12A has a substantially conical bore 14 having a central frusto-conical portion 30, a smaller diameter short cylindrical bore portion 32, and a larger diameter short cylindrical bore portion 34 just as previously described with regard to FIG. 3 for the socket 12 of FIG. 1.

The difference between the connection 10A of FIG. 8 and the connection 10 of FIG. 1 is that the socket 12A does not have a continuous cylindrical outer surface like the socket 12. Instead the socket 12A has an upper cylindrical outer surface 100 joined at break line 102 to a frusto-conical tapered outer space portion 104, joined at break line 105 to a short sharply tapered frusto-conical outer surface 106, joined at break line 108 to a short smaller diameter cylindrical outer surface 110. Additionally, the upper cylindrical outer surface portion 100 of socket 12A is of relatively smaller outside diameter than is the socket 12 of FIGS. 1 and 3.

Four combinations of spike and socket material were modeled. The first combination was for an aluminum spike in an aluminum socket. The second combination was for a steel spike in an aluminum socket. The third combination was for an aluminum spike in a steel socket. The fourth combination was for a steel spike in a steel socket.

Figure 5:
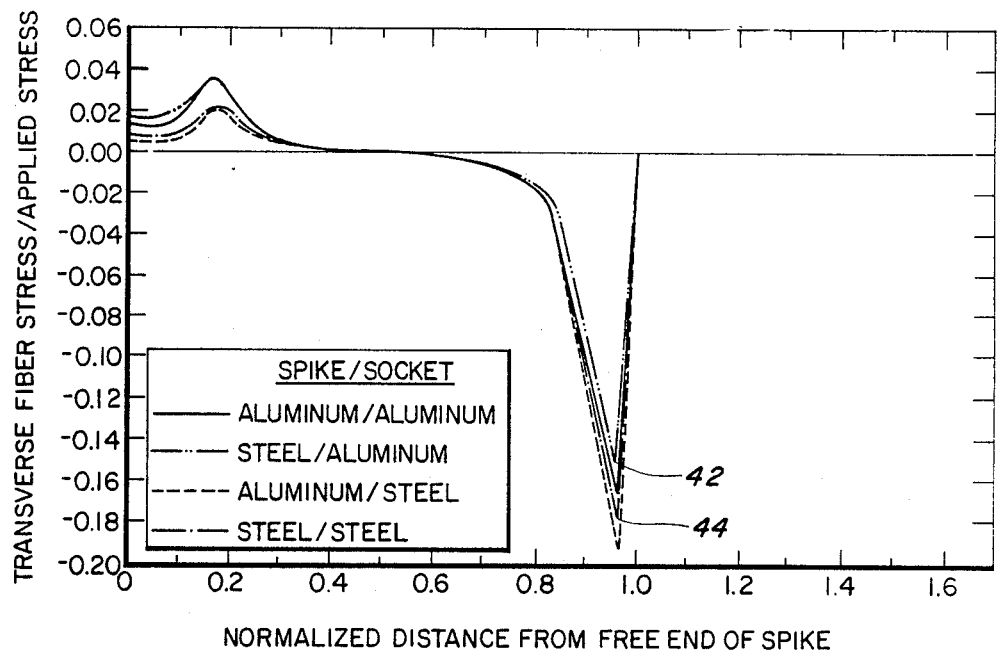
FIG. 5 is a graphical representation of the transverse fiber stress/applied stress for a spike and socket termination as a function of normalized distance from the free end of the spike, for various combinations of spike and socket materials.

FIG. 5 graphically represents transverse normal fiber stress relative to the applied axial cable stress as a function of the normalized distance from the free end of the spike. The four spike and socket material combinations are represented by four different line designations as explained in the schedule on the right-hand side of FIG. 5.

The data of interest in FIG. 5 is that found in the sharp downward spike near 1.0 on the horizontal axis. There it is apparent that the lowest transverse fiber stress by a significant degree is that provided by the combination of a steel spike in an aluminum socket. The highest transverse normal fiber stress level which resulted from that combination is represented by the lowest point 42 of the Steel/Aluminum curve which provides a value of approximately $-0.15$.

The highest stress for the Steel/Steel curve is represented by the point 44 which provides a transverse normal fiber stress of approximately $-0.175$.

Thus, it is apparent that the steel spike and aluminum socket combination provides approximately a 17% reduction in transverse normal fiber stress as compared to the steel spike and steel socket.

Figure 6:
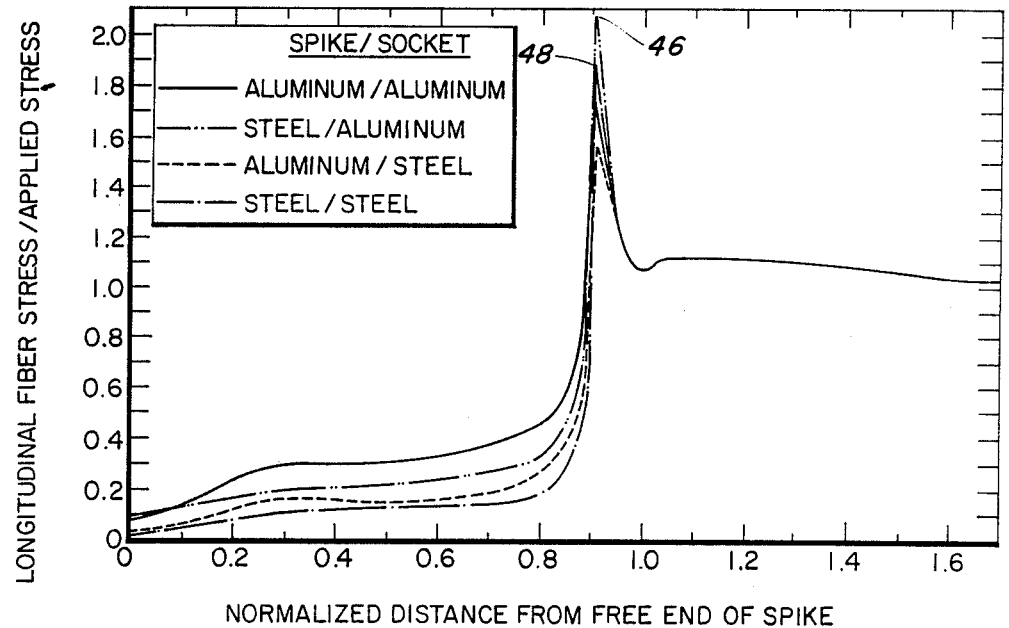
FIG. 6 is a graphical representation of the longitudinal fiber stress/applied stress for a spike and socket termination as a function of normalized distance from the free end of the spike, for various combinations of spike and socket materials.
Figure 7:
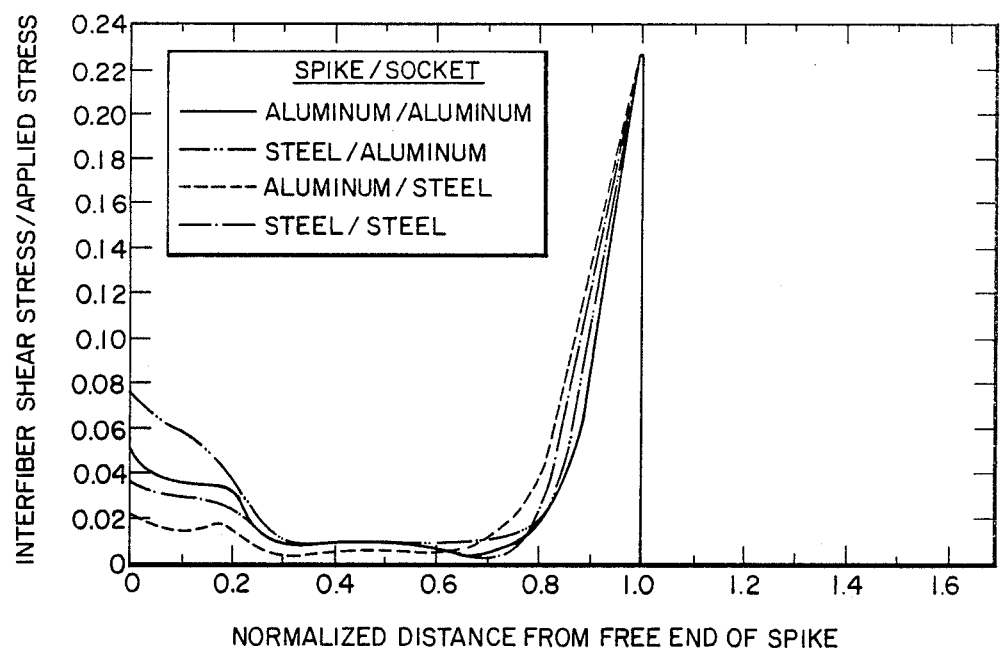
FIG. 7 is a graphical representation of the interfiber shear stress/applied stress for a spike and socket termination as a function of normalized distance from the free end of the spike, for various combinations of spike and socket materials.

FIGS. 6 and 7 further show that this substantial reduction in transverse normal fiber stress is accomplished with an acceptably small increase in longitudinal fiber stress as shown in FIG. 6 and with a negligible affect on interfiber shear stress as shown in FIG. 7.

The longitudinal fiber stress represented in FIG. 6 is the longitudinal tensile stress present in each of the fibers of the cable.

The data of interest is represented in the area of the sharp upward spike at approximately 0.9 on the horizontal axis. There it is seen that the steel spike/aluminum socket combination has the highest longitudinal fiber stress represented by the data point 46 which provides a value of approximately 2.05.

The steel spike and steel socket combination, on the other hand, provides a maximum longitudinal fiber stress as represented by the data point 48 of approximately 1.89, thus representing an increase in longitudinal fiber stress for the steel spike/aluminum socket combination of slightly less than 10% over the steel spike/steel socket combination. This can be satisfactorily taken into account when sizing the cable for a particular application.

Finally, FIG. 7 is a graphical representation of interfiber shear stress relative to applied axial stress as a function of the normalized distance from the free end of the spike. The "interfiber shear stress" is the shear stress in planes parallel to the local longitudinal axis of the cable.

In FIG. 7 the data of interest is that in the area of the upward spike at approximately 1.0 on the horizontal axis.

It is there apparent that the interfiber shear stress for all four spike and socket combinations is substantially the same.

While we do not at this time fully understand the physical reasons for the significant decrease in transverse fiber stress provided by the spike/socket combination of the present invention having a spike of a material of substantially higher modulus of elasticity than the socket, the data of FIG. 5 conclusively shows this to be the case.

It is also apparent from FIG. 5 that the improvement is not due merely to increased yieldability of the socket, since the steel spike/aluminum socket combination also significantly out-performs the aluminum spike/aluminum socket combination.

While the 17% decrease in transverse normal fiber stress provided by the steel spike/aluminum socket combination represented in FIG. 5 may not in itself be entirely sufficient to raise the cyclical load life of cables like those described with regard to Table II to acceptable levels for an application such as the tethering element of a tension leg platform, it does provide a significant positive step in that direction. When combined with other modifications such as perhaps lowering maximum cyclic loads allowed and also possibly optimizing the geometry of the spike tip and taper angle and socket terminal, the use of the high modulus spike/low modulus socket of the present invention significantly contributes to providing a spike and socket terminal assembly having a greatly increased cyclical load life.

Thus it is seen that the apparatus of the present invention achieves the ends and advantages mentioned as well as those inherent therein. While certain preferred embodiments have been disclosed and illustrated for the purposes of the present disclosure, numerous changes in the arrangement and construction of parts may be made by those skilled in the art which changes are encompassed within the scope and spirit of the present invention as defined by the appended claims.

What is claimed is:

1. A spike and socket cable termination apparatus for use with a fibrous cable, said apparatus comprising:
    an outer socket having a substantially conical bore disposed therein for receiving an end portion of said fibrous cable;
    a spike having a substantially conical outer surface for receipt in a center portion of said fibrous cable end portion with strands of said fibrous cable distributed in a substantially conical shape between said spike and said socket and thus providing a means for wedging said fibrous cable end portion in place within said socket; and
    wherein said socket is constructed of a material of substantially lower modulus of elasticity than said spike in order to substantially reduce a transverse normal stress applied to said strands of said fibrous cable end portion thereby increasing a cyclical load life of said fibrous cable adjacent said spike and socket cable termination.

2. The apparatus of claim 1 wherein the modulus of elasticity of said socket is preferably no greater than one half the modulus of elasticity of said spike.

3. The apparatus of claim 2 wherein said spike is constructed of steel and said socket is constructed of aluminum.

4. The apparatus of claim 2 wherein the modulus of elasticity of said socket is more preferably in the range from about $\frac{1}{3}$ to about $\frac{1}{2}$ the modulus of elasticity of said spike.

5. The apparatus of claim 1 wherein said fibrous cable is comprised of a high strength material.

6. The apparatus of claim 5 wherein said high strength material of said fibrous cable comprises Kevlar.

7. The apparatus of claim 6 wherein said Kevlar fibers are arrayed in a parallel-lay pattern.

8. The apparatus of claim 1 wherein the material from which the socket is constructed is sufficiently non-malleable that said conical bore of said socket is not substantially deformed by individual strands of said fibrous cable.

9. A cable termination assembly, comprising:
    an outer socket having a substantially conical bore disposed therethrough, said bore having a smaller first open end and a larger second open end, said socket being constructed of a first material which has a first modulus of elasticity;
    a fibrous cable having an end portion thereof received through smaller first open end and in said conical bore; and
    a spike having a substantially conical outer surface received through said larger open end of said conical bore and in an axially central part of said fibrous cable end portion with strands of said fibrous cable distributed in a substantially conical shape between said spike and said socket, said spike being tightly wedged in said socket so that said strands of said cable are held in place between said spike and said socket, said spike being constructed of a second material having a second modulus of elasticity substantially greater than said first modulus of elasticity thereby reducing the normalized stress applied to said strands of said fibrous cable end portion and increasing a cylical load life of said cable at its point of engagement with said spike and socket.

* * * * *